Figure 1:
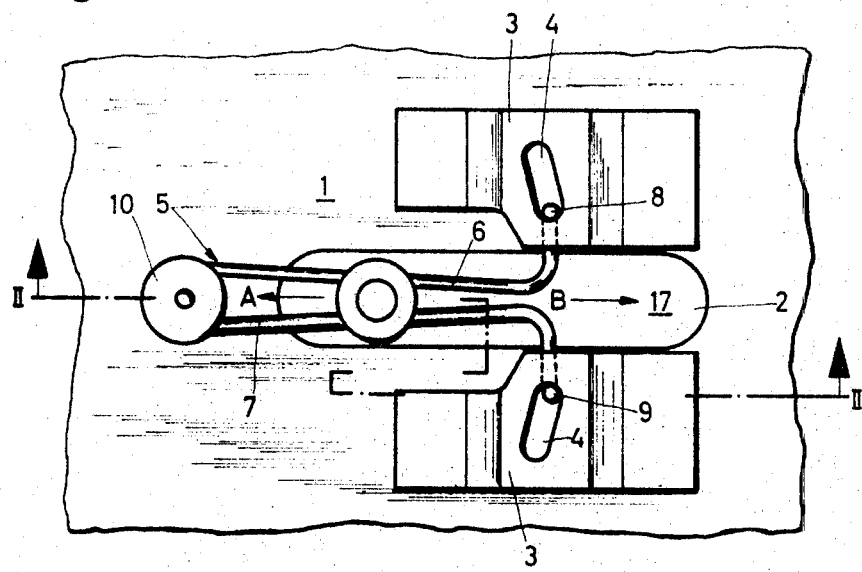

United States Patent [19]
Schon et al.

[11] 3,843,078
[45] Oct. 22, 1974

[54] DEVICE FOR SECURING FLEXIBLE FUEL TANKS IN AN AIRCRAFT

[75] Inventors: Volker Schon, Munich, Germany; Bernd R. Walter, Kirkland, Wash.; Peter Zipperling, Poing, Germany

[73] Assignee: Messerschmitt-Bolkow-Blohm GmbH, Munchen, Germany

[22] Filed: Nov. 8, 1973

[21] Appl. No.: 414,093

[30] Foreign Application Priority Data
Nov. 18, 1972 Germany............... 2256744

[52] U.S. Cl............................................ 244/135 B
[51] Int. Cl............................................. B64d 37/00
[58] Field of Search....... 244/135 B, 135 R; 24/216, 24/218, 211 L, 224 SS, 224 PS; 248/175, 361 R

[56] References Cited
UNITED STATES PATENTS

| | | | |
|---|---|---|---|
| 1,676,382 | 7/1928 | Carr...................... | 24/218 |
| 1,820,450 | 8/1931 | Fenton................... | 24/224 |
| 2,071,575 | 2/1937 | Reiter.................... | 24/224 SS |
| 2,239,004 | 4/1941 | Jung...................... | 24/218 |
| 2,519,393 | 8/1950 | Hayes.................... | 244/135 B |
| 2,526,790 | 10/1950 | Wrablewski.............. | 24/218 |
| 2,943,373 | 7/1960 | Rapata................... | 24/216 |

FOREIGN PATENTS OR APPLICATIONS
365,005    12/1922    Germany

*Primary Examiner*—Trygve M. Blix
*Assistant Examiner*—Galen L. Barefoot
*Attorney, Agent, or Firm*—Woodhams, Blanchard and Flynn

[57] ABSTRACT

A device for securing flexible fuel tanks for use in aircraft, which tanks can, if desirable, have a self-sealing structure to render the tank essentially leak proof. The device is composed of a U-shaped spring member which is secured to the wall of an aircraft and has a pair of flexible legs extending coextensively with an elongated opening in the wall of the aircraft. A locking pin having an enlarged tapered head and a small neck portion is secured to the flexible tank structure and is adapted to be received between the flexible legs of the U-shaped spring members. The length of the elongated opening in the wall of the aircraft is longer than the length of the legs of the U-shaped spring member. As a result, a movement of the locking pin longitudinally of the elongated opening will effect a movement of the locking pin into an area wherein the legs of the U-shaped spring member no longer embrace the locking pin. Thus, the head of the locking pin may be removed from the elongated opening and, consequently, the engagement between the wall of the aircraft and the flexible fuel tank terminated.

3 Claims, 2 Drawing Figures

DEVICE FOR SECURING FLEXIBLE FUEL TANKS IN AN AIRCRAFT

The invention relates to a device for securing flexible fuel tanks in an aircraft, which device consists of two flexible legs which are arranged on one wall of the aircraft structure, which legs are placed around the shaft of a locking pin which is guided through the wall of the aircraft structure.

In order to secure fuel tanks in an aircraft, it is known to use ropes which are guided through corresponding ears both on the tank and also on the aircraft structure. This method, which is known as a "lacing system," can, however, not be used if a sufficient accessibility to the tank chamber does not exist. The latter is mostly the case in high-performance aircrafts.

Furthermore, a suspension for fuel tanks is known which has a pin which extends through the wall of the fuel tank. To secure to fuel tank on the aircraft structure, the part of the pin which is introduced into same is spread apart through a power effect on the part of the pin which is provided inside of the fuel tank. This suspension device has the disadvantage that the tank wall is punctured. A result of this is that in the case of self-sealing tanks the self-sealing characteristics of the tank material no longer exist in the zone of the suspension. A further disadvantage of the known device which is true for both bulletproof and for simple tanks consists in that the barriers which are supposed to prevent a diffusing of the fuel through the tank wall are also interrupted in the zone of the suspension.

Finally German Pat. No. 365,005 discloses a tank closure in which the closure members consist of two flexible legs which are placed around the shank of a pin which is guided through the sidewall of the tank. The invention disclosed herein is an improvement on this state of the art. However, the known device is not or is only poorly suited for an attachment or suspension of a fuel tank in an aircraft because a releasing of the tank would require a considerable, additional construction cost due to a poor accessibility to the suspension device.

The basic purpose of the invention is to produce in particular an attachment or suspension device for a flexible fuel tank on an aircraft structure, which can be suspended or supported with low force requirements and can be released by an application of a very small and insignificant force thereto.

According to the invention, the above mentioned purpose is attained in such a manner that the flexible legs consist of a U-shaped spring wire which is arranged in a plane parallel to the wall of the aircraft structure, and that in the zone of the open end of the spring wire a longitudinal opening is provided in the wall, which longitudinal opening permits the passage of a locking pin having an enlarged tapered head and a small neck portion, which locking pin is secured to the fuel tank, for engagement between the legs of the U-shaped spring wire, whereby the longitudinal opening extends so far over the open side of the spring wire that the lock pin through a longitudinal movement in this zone can again be released from an embracing engagement by the flexible legs. It is therefore possible by moving the locking pin in a direction to the open side of the U to separate the fuel tank from the aircraft structure without requiring a special power input and thereby preventing damage to the inventive device.

Through the invention, an additional advantage is achieved in that the position tolerance of the tapered locking pin on the rubber tank may be relatively large because, depending on the leg length of the legs of the U-shaped spring wire, the tapered locking pin can be moved accordingly without effecting a release of the connection.

According to a further characteristic of the invention, the spring wire can at the closed side of the U-shaped spring wire be wound around a tubular rivet secured to and extending through the wall of the aircraft structure. The spring force of the legs of the U-shaped spring wire can be adjusted as desired or can be adjusted to the respective existing needs to prevent, for example, an automatic release of the inventive device.

Figure 2:
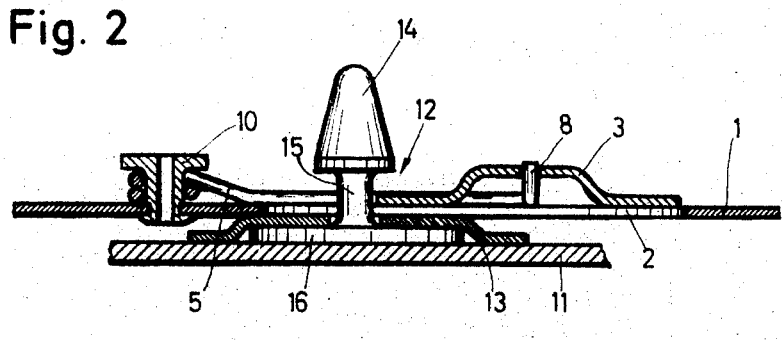

One exemplary embodiment of the invention is illustrated in the drawings, in which:

FIG. 1 is a top view of the side of the device which does not face the fuel tank; and FIG. 2 is a cross-sectional view along the line II—II of the device according to FIG. 1.

In the drawing, reference numeral 1 identifies a wall in an aircraft structure, which wall has an elongated opening 2 therein. Two guide plates 3 are riveted to the wall 1, which guide plates have slots 4 therein. Reference numeral 5 identifies a U-shaped spring wire, the legs of which are identified by reference numerals 6 and 7. The ends 8 and 9 of the legs 6 and 7 are bent over and up in such a manner that they each are slidably received in one of the slots 4. The closed side of the U-shaped spring wire 5 has a plurality of loops therein which are looped around a hollow cylindrical rivet 10 having a radially outwardly extending flange at the upper end. The rivet 10 is secured to and extends through the wall of the aircraft structure. FIG. 2 illustrates two loops at the closed end of the U-shaped spring wire. The number of such loops can, however, be varied to generate a desired spring force constant.

Reference numeral 11 identified the wall of a flexible fuel tank. A tapered, undercut locking pin 12 is secured to the wall 11. More specifically, the tapered locking pin 12 has an enlarged front tapered part 14, a neck portion 15 and a fastening plate 16 which is fastened, for example, by vulcanizing to the wall 11 of the fuel tank. A canvas or rubber sleeve 13 is secured, for example, by a vulcanization process and serves to reinforce the securement of the pin 12 to the wall 11.

The tapered part 14 of the locking pin 12 is pressed through the opening 2 in the wall 1 and between the legs 6 and 7 of the U-shaped spring 5 so that the legs 6 and 7 grip around the neck portion 15 to effect a securement of the fuel tank to the wall 1 of the aircraft. The locking pin 12 can now no longer be pulled back; however, it has the capability of moving in direction of the arrows A and B illustrated in FIG. 1. If one wants to release the fuel tank 11 from its attachment or suspension to the wall 1, the fuel tank 11 must be moved in direction of the arrow B beyond the opening of the U-shaped spring wire 5 until it is in the open or free space 17 beyond the ends of the legs 6 and 7. In this position, the locking pin 12 lies outside of the zone of the legs 6 and 7 of the spring wire 5 and the fuel tank can be pulled out of the device.

To ease the operation of the inventive device, it is advantageous to construct the tapered part 14 as slim as possible so that its introduction between the legs 6 and 7 during fastening of the fuel tank will require very little force.

The embodiments of the invention in which an exclusive property or privilege is claimed are defined as follows:

1. Device for securing flexible fuel tanks in an aircraft, which consists of two flexible legs which are arranged on one wall of the aircraft structure, which legs are placed around the shaft of a locking pin which is guided through the wall of the aircraft structure, comprising the improvement wherein the flexible legs (6, 7) consist of a U-shaped spring wire (5) which is arranged in a plane parallel to the wall (1) of the aircraft structure, and that in the zone of the open side of the spring wire (5) a longitudinal opening (2) is provided in the wall (1), which longitudinal opening permits the passage of a tapered locking pin (12) having a neck portion, said locking pin being secured to the fuel tank, for engagement between the legs (6, 7), whereby the longitudinal opening (2) extends so far over the open side of the spring wire (5) that the locking pin, through a longitudinal movement in this zone (17), can be released from an embracing engagement by the flexible legs (6, 7).

2. Device according to claim 1, wherein the spring wire (5) at the closed side thereof is looped around a tubular rivet (10) which is secured to and extends through the wall of the aircraft structure.

3. Device according to claim 1, wherein the locking pin (12) has a fastening plate (16) thereon which is secured by vulcanizing on the wall (11) of the fuel tank.

* * * * *